(12) United States Patent
Hamilton (10) Patent No.: US 12,376,020 B2
(45) Date of Patent: Jul. 29, 2025

(54) MOBILE COMMUNICATIONS

(71) Applicant: Remarkable Technology Limited, London (GB)

(72) Inventor: Colin Brian Hamilton, Chester (GB)

(73) Assignee: Remarkable Technology Limited, London (GB)

( * ) Notice: Subject to any disclaimer, the term of this patent is extended or adjusted under 35 U.S.C. 154(b) by 310 days.

(21) Appl. No.: 17/791,893

(22) PCT Filed: Jan. 5, 2021

(86) PCT No.: PCT/GB2021/050020
§ 371 (c)(1),
(2) Date: Jul. 9, 2022

(87) PCT Pub. No.: WO2021/140318
PCT Pub. Date: Jul. 15, 2021

(65) Prior Publication Data
US 2023/0044814 A1    Feb. 9, 2023

(30) Foreign Application Priority Data

Jan. 10, 2020  (GB) ...................................... 2000347

(51) Int. Cl.
*H04W 4/00* (2018.01)
*H04W 36/14* (2009.01)
(Continued)

(52) U.S. Cl.
CPC ........... *H04W 48/18* (2013.01); *H04W 36/14* (2013.01); *H04W 36/302* (2023.05);
(Continued)

(58) Field of Classification Search
CPC ... H04W 48/18; H04W 36/14; H04W 36/302; H04W 64/006; H04W 72/542;
(Continued)

(56) References Cited

U.S. PATENT DOCUMENTS

| 11,166,148 B2 * | 11/2021 | Krauss | .................. H04W 76/15 |
| 2007/0140256 A1 * | 6/2007 | Yaqub | ............... H04W 28/0226 |
| | | | 370/332 |

(Continued)

OTHER PUBLICATIONS

European Patent Office, International Search Report for PCT/GB2021/05020, Mar. 16, 2021, pp. 1-4.

(Continued)

*Primary Examiner* — Phuongchau Ba Nguyen
(74) *Attorney, Agent, or Firm* — CAHN & SAMUELS, LLP (57) ABSTRACT

The invention is concerned with improvements in mobile communications, and especially with improvements in bonding communications simultaneously utilising multiple mobile networks. It may be embodied in a mobile device (12a, 12b, 12c). The mobile device (12) has a plurality of mobile network interface units (22a, 22b, 22c) each of which is configurable to connect to each of a group of mobile networks (16a, 16b, 16c). The mobile device (12) comprises at least one digital processing device implementing allocation logic which allocates each mobile network unit to one of the mobile networks (16a, 16b, 16c) and causes each mobile network interface unit (22a, 22b, 22c) to be configured to connect to the network (16a, 16b, 16c) to which it is allocated. The allocation logic serves to allocate the mobile network units (22a, 22b, 22c) to the mobile networks (16a, 16b, 16c) based on operating parameters, and to re-allocate the mobile network interface units (22a, 22b, 22c) in response to changes in the operating parameters, causing the mobile network units (22a, 22b, 22c) to be re-configured such as to disconnect from one mobile network and connect to another mobile network.

20 Claims, 7 Drawing Sheets

(51) Int. Cl.
 *H04W 36/30* (2009.01)
 *H04W 48/18* (2009.01)
 *H04W 64/00* (2009.01)
 *H04W 72/542* (2023.01)
 *H04W 12/40* (2021.01)
 *H04W 88/06* (2009.01)

(52) U.S. Cl.
 CPC ....... *H04W 64/006* (2013.01); *H04W 72/542* (2023.01); *H04W 12/40* (2021.01); *H04W 88/06* (2013.01)

(58) Field of Classification Search
 CPC ..... H04W 12/40; H04W 88/06; H04W 24/08; H04W 12/122; H04W 12/45; H04W 12/12; H04W 80/04; H04W 88/08; H04W 84/18; H04L 29/06
 See application file for complete search history.

(56) References Cited

U.S. PATENT DOCUMENTS

| | | | |
|---|---|---|---|
| 2012/0033718 A1 | 2/2012 | Kauffman et al. | |
| 2014/0075057 A1 | 3/2014 | Sakr et al. | |
| 2015/0057044 A1* | 2/2015 | Altman | H04W 12/08 455/558 |
| 2015/0264520 A1* | 9/2015 | Beauregard | H04W 4/02 455/456.1 |
| 2017/0257764 A1 | 9/2017 | Remmert | |
| 2019/0068651 A1* | 2/2019 | Briggs | H04W 12/68 |
| 2019/0149667 A1 | 5/2019 | Altman | |
| 2024/0356849 A1* | 10/2024 | Inbal | H04L 45/566 |

OTHER PUBLICATIONS

European Patent Office, Written Opinion for PCT/GB2021/05020, Mar. 16, 2021, pp. 1-12.

* cited by examiner

PRIOR ART

MOBILE COMMUNICATIONS

The present invention is concerned with improvements in mobile communications.

The term "mobile" used in relation to networks, communications, telecommunications, phones, smartphones or other digital devices, must be understood herein to refer to a system or device using, comprising, or configured to connect to, a geographically distributed population of wireless/radio base stations to implement or engage with a wide area network (WAN) for exchange of data. The term includes current mobile telecommunications networks of the type referred to colloquially as "mobile networks" in the UK and as "cellular networks" in US English.

Telecommunications based on mobile networks have of course had a huge impact on modern life and become a globally ubiquitous means for enabling users to communicate, to access data sources, and to transmit data whilst "on the go", without need of a wired network connection tying the user to a fixed location. One common mobile device is the smartphone but mobile communications are increasingly used for purposes not relating to telephony as such, with mobile devices becoming for example one of the predominant means of access to the World Wide Web. Broadcasters may use mobile connectivity to transmit live broadcasts on location. A vast range of autonomous or semi-autonomous devices use the mobile network for transfer of data and receipt of instructions in what is sometimes referred to as the "internet of things".

There are two major technical challenges to be addressed in mobile networks that are important to the present discussion: (1) service quality, and especially continuity of connectivity and (2) security. These will be explored in turn.

Despite vast improvements over recent decades in the performance of mobile networks, problems relating to service quality will be familiar to the contemporary reader.

A major factor in mobile service quality is the incomplete geographical coverage provided by individual mobile networks. No single mobile network provides perfect coverage over a large geographical area. Current smartphones are typically configured to connect to the mobile network of a single provider. If that network does not provide wireless coverage at the device's location then mobile network connectivity is unavailable. The problem is compounded when the device is used during travel (e.g. in a car or train) since connectivity is often intermittently lost as the device moves into and out of range of the base stations of the relevant mobile network.

Another factor affecting continuity of service for devices used during travel concerns handover from a first cell (associated with a first network base station) to a second cell (associated with a second network base station). As the device moves out of the one cell into the other, it is necessary to make a new connection to the second cell, and to drop the connection to the first. Despite a range of measures taken to improve reliability of the handover process, it can lead to discontinuities in network connectivity.

At the time of writing, users of mobile devices often find it necessary to move from one place to another in order to obtain an adequate mobile signal. Sometimes this is as simple as moving from inside a building to the outside, but in other instances users may try walking from one outside location to another in order to find—often simply by chance, or perhaps being guided by past experience—a spot where the signal strength is adequate. While experience shows that this can be an effective strategy, it is clearly far from optimal and some improved means of finding a location with an adequate signal would be advantageous.

Even where connectivity at some level is available, the bandwidth available through a given mobile network can be affected by a range of factors including (a) received signal strength (which is affected e.g. by distance between the device and base station, objects such as walls in the transmission path and so on), (b) RF interference, which can come from a range of sources, and (c) network prioritisation/deprioritisation of a given user.

An aspect of service quality which is not necessarily as apparent to the user relates to energy usage by the mobile device. Modern mobile devices adjust their transmission power in response to performance of the radio link to the base station. In particular, transmitter output power increases with increasing distance from the connected base station, so that a device being used at a large distance from a base station consumes more power than one closer to the base station, and so has a shorter battery lifetime. A mobile device without mobile network connectivity emits a polling signal of progressively increasing strength to poll for base stations in range, so that an active mobile radio modem deprived of connectivity may in itself consume undesirably high battery power.

Mobile service quality can be improved by concurrent use of two or more mobile networks. Many industrialised countries have four different mobile networks each provided by a different commercial network provider. So-called bonding routers are commercially available and are used in a range of applications where the need to maximise bandwidth and/or continuity of service justify the expense involved. Examples include systems used to provide internet connectivity on passenger vehicles such as trains, buses, boats; systems used for outside broadcasts; those used by some emergency services, and so on. A typical current LTE-based bonding router comprises multiple SIMs (typically four— one for each commercial mobile network) each allocated to a respective mobile radio modem. As the modem detects that the SIM's network is in range, it connects. Hence the bonding router may in principle connect to all of the available mobile networks at one time. U.S. Pat. No. 10,237,162B2 (assigned to Viprinet Europe GmbH) explains that individual packets of the transmitted data may be fragmented for transmission over separate lines, and that quality characteristics of individual lines of connectivity may be monitored so that a level of redundancy can be determined for the lines to avoid loss of data packets.

The known approach, in a bonding router, of providing multiple radio modems each constantly configured to connect to a respective mobile network suffers from various drawbacks. One of these is that at any given time and location at least one of the radio modems is typically redundant, since there are typically large geographical areas in which only three or fewer of the typical four commercial networks are available. Another disadvantage concerns energy consumption. As noted above, a radio modem adjusts its transmission power according to signal strength. If unconnected to its network it will transmit a polling signal with progressively increasing signal strength, in an attempt to establish a connection. In the conventional bonding mobile router, which continuously attempts to maintain connections to all of the available networks, it is likely that for much of the time there will be one or more radios which is either unconnected or connected to a distant base station, and which is therefore consuming high power. The high resultant energy consumption may for example be acceptable in some contexts (as for example where the router is operated on a train) but limits the applications of the technology to smaller lighter devices, especially portable or hand held devices for which the size of the battery and the rate of battery drain (and hence the period of operability between charges) are crucial aspects of device performance.

We turn now to questions relating to security in relation to mobile networks. Mobile devices are vulnerable to various forms of cyber-attack including "Man in the Middle" attacks and "Denial of Service" (DoS). Often in order to enable an attack the cyber-criminal needs to identify the target and this is done by identifying the IMSI or the IMEI (Wireless MAC address) of the target device.

One form of cyber-attack uses a device called an IMSI catcher. This is a readily available, often portable, and low-cost system used by criminals to implement what amounts to a "fake" mobile base station (cell tower). The criminal may set the IMSI catcher up in a chosen area and then look for local mobile target devices using simple spectrum analyser technology. When a target is identified, the criminal connects the IMSI catcher to the local base station that is to be replicated, which might for example be operated by Vodaphone®. The IMSI catcher then adopts a Vodaphone® base station digital identity and transmits at progressively increasing signal power. As the signal of the IMSI catcher at the target mobile device becomes stronger than that of the legitimate mobile network base station, the target device "jumps" to connect to the stronger IMSI catcher connection. Service may then be denied to the user, or alternatively data to and from the target mobile device may be relayed by the IMSI catcher to the legitimate mobile base station, so that from the point of view of the user of the target mobile device normal service is maintained, and that user—the victim of the attack—is thus unaware that it is going on. During the attack however the cyber-criminal receives the victim's data and may be able to read and store information including email, texts, chat and so on. The criminal may also be able to "sniff" for passwords for online accounts.

The present application discloses several inventions intended to provide improved mobile communication, and in particular to address one or more of the problems alluded to above.

According to a first aspect of the present invention there is a mobile device comprising
  a plurality of mobile network interface units each of which is configurable to connect to any of a group of mobile networks; and
  at least one digital processing device implementing allocation logic which allocates each mobile network unit to one of the mobile networks and causes each mobile network unit to be configured to connect to the network to which it is allocated,
the allocation logic serving to allocate the mobile network units to the mobile networks based on operating parameters, and to re-allocate the mobile network interface units in response to changes in the operating parameters, causing the mobile network units to be re-configured such as to disconnect from one mobile network and connect to another mobile network.

The word "unit" as used herein may refer to a physical unit or to a functional (virtual) unit. The mobile network interface units may each comprise a respective mobile radio modem. In current embodiments each of the mobile network interface units comprises a respective mobile radio modem. These may each be formed by a separate physical device. In other embodiments the functions of the multiple mobile network interface units may each be implemented through a single physical device.

By exploiting the facility to dynamically allocate and re-allocate the mobile network interface units to the available mobile networks, the invention opens up a whole range of advantageous possibilities.

In an embodiment there are fewer mobile network interface units than available mobile networks. In an embodiment there is one fewer mobile network interface units than there are available mobile networks.

In an embodiment the mobile device comprises three, and no more than three, network interface units.

In an embodiment no more than one of the mobile network interface units undergoes re-allocation at any given time.

In an embodiment the processing device is configured to receive connection quality measurements from the network interface units and the allocation logic serves to re-allocate the mobile network interface units in response to changes in the connection quality measurements.

In an embodiment the allocation logic serves to re-allocate any of the mobile network interface units in response to a connection quality measurement from that mobile network interface unit below a threshold.

In an embodiment the mobile device comprises a geolocation device or sensor arrangement for determining whether the device is moving or is at rest, the allocation logic being such as to implement different strategies for allocation of the mobile network interface units when (a) the mobile device is travelling and (b) the mobile device is at rest.

In an embodiment the allocation logic causes each of the mobile network interface devices to be allocated to a different mobile network when the device is travelling.

The allocation logic may permit two or more of the mobile network interface devices to connect to the same mobile network when the mobile device is at rest.

The mobile device may comprise a geolocation device, and the allocation logic may serve to retrieve network coverage data from a database by reference to the geolocation of the mobile device, and to utilise the network coverage data in allocating the digital processing devices to the networks.

In an embodiment the allocation logic serves to determine from data provided by the geolocation device a speed and direction of travel of the mobile device and thereby to determine whether the mobile device is moving into a region where connection quality of any of the mobile networks to which the network interface devices are connected is indicated to be poor in the network coverage data, and to re-allocate the affected network interface device to a different mobile network in response.

In an embodiment the mobile device comprises a list of mobile network identifiers allocatable to the mobile network interface devices.

In an embodiment the mobile device is configured to permit the list of mobile network identifiers to be re-written with mobile network identifiers received from a remote server through a network.

In an embodiment the list of mobile network identifiers comprises a plurality of mobile network identifiers in respect of one mobile network, or in respect of each of the mobile networks, and the mobile device is configured to allocate the mobile network identifiers in respect of each network in rotation, in random sequence, or in another sequence.

In an embodiment the mobile device is configured to record connection quality measurements in respect of the mobile networks in association with the geolocation of the mobile device, thereby enabling network coverage data to be compiled.

In an embodiment the mobile device is configured to pass network coverage data obtained from measurements of network connection quality to a remote server through a network.

In an embodiment the mobile device is configured to encrypt data transmitted through the mobile network interface units.

In an embodiment the mobile device is configured, in response to a loss of data connectivity through any of the mobile network interface units, to determine the connection quality through the affected mobile network interface unit, and in the event that the connection quality is sufficient for data transmission, to create a record indicative of a possible cyber-attack.

In an embodiment, the mobile device is configured to transmit the record indicative of possible cyber-attack is transmitted to the intermediary. The record may include the network identifier of a mobile base station to which the affected mobile network interface device is connected. This can enable the intermediary to create a blacklist of fake base stations being operated by cyber criminals.

According to a further aspect of the present invention there is a method implemented in a mobile device of exchanging data with a remote server using multiple mobile networks, the method comprising
  providing the mobile device with multiple mobile network interface units each of which is configurable to connect to any of a group of mobile networks;
  allocating each mobile network unit to one of the mobile networks and causes each mobile network unit to be configured to connect to the network to which it is allocated,
  monitoring operating parameters of the mobile device, and
  re-allocating the mobile network interface units in response to changes in the monitored operating parameters, causing the mobile network units to be re-configured such as to disconnect from one mobile network and connect to another mobile network.

According to a further aspect of the present invention there is an application comprising instructions for running on a mobile device having a geolocation device to cause the mobile device to:
  interrogate a database of mobile network coverage data;
  determine the geolocation of the mobile device;
  determine a direction of travel to reach a location providing improved network coverage, based on the network coverage data; and
  output to a user an indication of the determined direction of travel.

The application is thus able to exploit the network coverage data to instruct the user to move in a direction that will provide improved mobile connectivity.

The indication of the direction of travel may for example take the form of an arrow on a display screen pointing in the determined direction of travel. A distance to the desired location may also be displayed.

According to a further aspect of the present invention there is a mobile device configured to implement the above method.

According to a further aspect of the present invention there is a method of guiding a user of a mobile device having a geolocation device, the method comprising:
  interrogating a database of mobile network coverage data;
  determining the geolocation of the mobile device;
  determining a direction of travel to reach a location providing improved network coverage, based on the network coverage data; and
  outputting to the user an indication of the determined direction of travel.

According to a further aspect of the present invention there is a method of obtaining network coverage data in respect of one or more mobile networks, the method being implemented using a mobile device which is provided with a geolocation device and is connected to a mobile network, the method comprising repeatedly:
  measuring quality of the connection of the mobile device to the mobile network,
  determining the geolocation of the mobile device, and
  logging the measured connection quality in association with the determined geolocation to form network coverage data.

Thus even while being used in otherwise conventional manner a mobile device may be exploited to map and record network coverage. Mobile devices are routinely carried about by their users so that data for multiple geolocations can be obtained from a single device.

The resultant network coverage data may be stored in the mobile device for subsequent use.

But the volume of network coverage data and its geographical extent can be greatly increased by implementing the method in relation to a population of mobile devices. In an embodiment, the method further comprises operating a remote server to receive network coverage data from multiple mobile devices and to process the received data to form a network coverage database.

In some embodiments, the mobile devices used are of the above described type comprising a plurality of mobile network interface devices, so that data relating to multiple mobile networks is able to be compiled simultaneously by a single mobile device.

Specific embodiments of the present invention will now be described by way of example only with reference to the accompanying drawings, in which.

While the following terms are known to the skilled reader, it may be noted that:
  LTE is an abbreviation of "Long-Term Evolution"—a current standard for mobile communications networks);
  SIM is an abbreviation of "Subscriber Identity Module". A SIM comprises an "International Mobile Subscriber Identity" or IMSI and its related key, enabling identification and authentication of a mobile subscriber. As used throughout this document, the abbreviation SIM refers both to (a) the type of SIM embodied in a replaceable memory device configured to connect to a mobile device, and typically in the form of a card carrying an integrated circuit; and (b) SIMs which use re-writable memory to store the relevant data, including eSIMs ("embedded SIMs") which are programmable units fixedly mounted to the device. This is a technology that is being increasingly widely adopted at the time of writing;

IMSI is an abbreviation of "International Mobile Subscriber Identity" and is an identifier that provides a unique identity to the mobile network. In current network protocols it is stored as a 64-bit field and it is sent by the mobile device to the network;

A VPN ("Virtual Private Network") is an encrypted connection made through a network that need not in itself be cyber secure;

IoT ("Internet of Things") refers to network connected devices with the ability to transfer data over a network with a degree of autonomy;

An IMEI ("International Mobile Equipment Identity") is a unique identifier attributed to a mobile radio transmitter.

Figure 1:
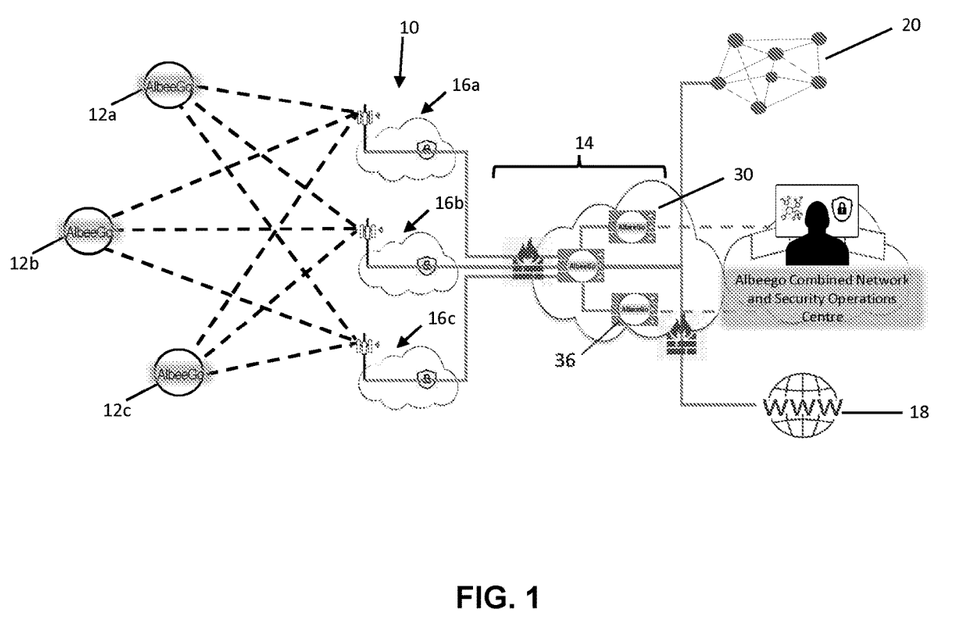
FIG. 1 is a schematic representation of the architecture of a communications system embodying the present invention.

The communications system 10 represented in FIG. 1 serves to implement a wide area network for exchange of data with mobile devices 12a, 12b, 12c. The mobile devices 12a, 12b, 12c are configured to communicate with an intermediary 14 through multiple communications channels, including multiple mobile networks 16a, 16b, 16c. Through the intermediary 14, the mobile devices 12a, 12b, 12c are able to exchange data with further networks which may for example be the internet 18 or a corporate network 20, thereby enabling data to be routed from the mobile devices 12a, 12b, 12c to the data's intended destination.

In the present embodiments the intermediary 14 is operated by a commercial organisation and has a variety of functions, as will be explained below.

A suite of software is implemented on the mobile device 12 to enable it to interact suitably with the intermediary 14 through the available communications channels. This software includes a core data bonding application that manages essential functions including the division of data between the communications channels, with load balancing. Hence data transmitted from the mobile device 12 is divided between the available mobile network connections 16a, 16b, 16c and transmitted through them to the intermediary 14, where the data is reconstructed for onward delivery. In the other direction the intermediary 14 serves to divide data between the mobile network connections 16a, 16b, 16c for despatch to the mobile device 12, and the application running on the mobile device 12 reconstructs the data.

The individual parts of the communications system will be considered in turn.

Mobile Device

Each of the mobile devices 12 comprises a digital device configured to transmit and receive data through the mobile networks 16a, 16b, 16c, but beyond that the present invention imposes few limitations on its form or purpose. It may comprise any suitable current or future form of computing device including without limitation a mobile telephone, tablet computer or laptop computer. While the invention is applicable especially to devices used "on the go" without a tethered network connection, including handheld or otherwise portable devices, it may be applied to "static" computing devices such as desktop computers or servers. The mobile device 12 may be self-contained, in the sense that it incorporates in a single physical unit the router functions needed to interface to the mobile networks 16a, 16b, 16c as well as the processing capacity and other components necessary for the device's function. Thus, for example, the router functions may be incorporated into a tablet of mobile phone. However, the mobile device 12 may serve instead as a data intermediary. For example, it may take the form of a router unit through which data is exchanged with a separate processing unit, e.g. a mobile telephone or tablet, the two units being configured to exchange data with one another through any suitable data connection, which may be wired (it may for example use some form of wired bus such as a USB) or wireless, e.g. using one of the Bluetooth® communications protocols. The mobile device 12 may be implemented in, or connected to, some larger system or network. For example, it may form part of, or be connected to, the in-car entertainment and/or communications systems of a vehicle such as a motor car. The mobile device 12 may be used to implement a local area network, as for example a wireless network provided to passengers in a vehicle such as a train, boat or omnibus. The mobile device 12 may be formed as, or communicatively connected to, any form of wearable device, be it a watch, glasses or a wearable device in another form. The mobile device 12 may be any of the range of devices referred to by the term "internet of things". It may for example be a data sensing/logging unit configured to report sensor data to some remote data store. It may be a control unit, e.g. a car security system implementing functions such as immobilisation. It may comprise or control physical actuators, and so on.

Figure 2:
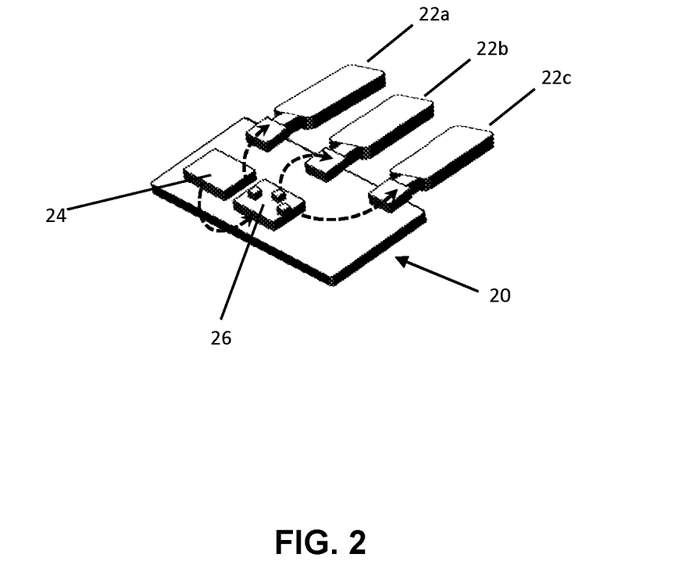
FIG. 2 depicts a circuit board arrangement used in a mobile device embodying the present invention.

The circuit board 20 depicted in FIG. 2 has been developed for use in a mobile device 12 in the form of a portable router unit, which may take the form of a self-contained and self-powered "puck" able to interface with a separate but local computing device through a wired connection or through a wireless connection, e.g. according to the Bluetooth® protocol. The circuit board 20 carries a plurality of mobile radio modems. More specifically, the present embodiment has exactly three mobile radio modems 22a, 22b, 22c. In the typical case where there are four commercially available mobile networks, it has been found by the inventor that the use of exactly three modems is optimal in terms of cost of manufacture, complexity and energy consumption/heat generation.

In present embodiments the mobile radio modems 22a, 22b, 22c are 4G or 5G LTE modems, but it is to be expected that future embodiments will use radios operating according to contemporary network protocols and standards.

The illustrated circuit board 20 incorporates in the present embodiment a high-powered USB hub for powering the mobile radio modems 22a, 22b, 22c and an integrated un-interruptible power supply and battery pack allowing completely tetherless operation. It carries, in the present embodiment which is implemented using current technology, three eSIM chips 24 and an IMSI register 26 for storing multiple IMSIs. The current embodiment allows up to 99 IMSIs to be stored, but this number may differ in other embodiments. Each of the eSIM chips 24 is associated with a respective mobile radio modem 22a, 22b, 22c. Each of the mobile radio modems 22a, 22b, 22c receives a respective IMSI from its associated eSIM 24, and the IMSI determines which of the available mobile networks the mobile radio modem 22a, 22b, 22c connects to, as well as identifying the modem uniquely to that network.

The illustrated circuitry allows any of the mobile radio modems 22a, 22b, 22c to be configured to hold any of the IMSIs stored in the register 26. This configuration of the radio modems 22a, 22b, 22c is dynamic, in the sense that they can be reconfigured as necessary in response to changes in operating conditions. Each of the radio modems 22a, 22b, 22c is able to connect to any of a group of different mobile networks. In the present example, each can be configured to connect to any of the four commercially available mobile networks, and again this configuration is dynamic—a given modem can be re-configured to connect to a different network in response to a change in operating conditions.

Re-allocation of the mobile radio modems 22a, 22b, 22c can be carried out during operation of the mobile device 12 under software control by "re-starting" the relevant modem, causing its device driver to be re-loaded with the new chosen IMSI from the modem's eSIM, which is updated prior to the restart.

The mobile device 12 may be provided with forms of connectivity other than connections to mobile networks. It may for example be configured to connect to local area networks, wired or unwired, such as Wi-Fi networks, when such are available.

Dynamic Configuration of Mobile Radio Modems

Allocation of IMSIs to the mobile radio modems 22a, 22b, 22c is carried out by modem allocation logic which in the present embodiment comprises software running on the mobile device 12. The modem allocation logic runs in the background during operation of the mobile device 12 and serves to monitor operating conditions and to configure the modems 22a, 22b, 22c in response thereto. The present invention makes possible a wide variety of strategies for allocation of the radio modems 22a, 22b, 22c but three possibilities in particular will be considered (and note that these are not mutually exclusive):—

1. allocation may take account of network connection quality, measured by the mobile device 12;
2. allocation may take account of whether the mobile device 12 is travelling or is being used statically, which can be established using geolocation data; and/or
3. allocation may take account of network coverage data, using the geolocation of the mobile device 12.

Looking firstly at network allocation based on connection quality, the modem allocation logic monitors connection quality of each of the mobile radio modems 22a, 22b, 22c. This may be done by checking connection quality periodically, say every 30 seconds. The invention is not limited to use of any specific measure of connection quality but in the present embodiment received signal strength (i.e. received signal power) is employed. Conventional mobile devices measure this quantity. Connection speed (bandwidth) may additionally or alternatively be taken into account in assessment of connection quality.

The modem allocation logic attributes a status to each of the mobile radio modems 22a, 22b, 22c indicative of the measured connection quality. In the present embodiment this status may be:

Green, meaning that there is a strong signal connection;
Amber, meaning that there is a weaker signal connection; or
Red, meaning that a connection to the relevant network cannot be established.

In a simple modem allocation strategy, any modem whose status is red may be re-allocated by provision to that modem of an IMSI associated with a different network, tending to keep all of the available modems connected.

In certain situations the best available performance may be achieved by having two or even all of the mobile radio modems 22a, 22b, 22c connect to the same mobile network, each using a different respective IMSI. In this way if a particular network is providing better signal strength/bandwidth than the others, the bandwidth available to the mobile device 12 as a whole can be maximised by exploiting that higher bandwidth through all three of the available mobile connections.

Often however there is a trade-off between maximising instantaneously available bandwidth and protecting against discontinuity of service—if all three of the mobile radio modems 22a, 22b, 22c are connected to the same network then any break in connection to that network may affect all three simultaneously, resulting in a complete loss of service. This is particularly problematic when the mobile device is used during travel, because (a) due to incomplete network coverage it is likely during a journey that the mobile device 12 will move through regions in which any single network is unavailable and (b) during any journey of sufficient length there must be handovers in which a mobile radio modem 22a, 22b, 22c picks up a connection to a new mobile base station and drops a connection to the old mobile base station, and such handovers can lead to breaks in connectivity. If the handover occurs at the same time for all three mobile radio modems 22a, 22b, 22c then the result may be a complete loss of connectivity to the mobile device 12.

To alleviate such problems, preferred embodiments of the invention are configured to determine whether the mobile device 12 is being used during travel or is being used statically, and to implement different modem allocation strategies in response. This determination of whether the device is travelling or static may be made using a geolocation device carried by the mobile device 12, which may be a satellite-based device. At the time of writing the predominant satellite-based geolocation system is the GPS system operated by the US Government, but other geolocation systems are under development and any suitable geolocation system may be used in implementing the present invention. Other means may be adopted for determining whether the mobile device 12 is travelling or static, e.g. accelerometry.

When the mobile device 12 is used statically, problems arising from changes of quality of network service are less frequent, and problems of discontinuity of service thus become less of a priority. So, at such times the modem allocation strategy may prioritise the best available bandwidth, even if that means that two or three of the mobile radio modems 22a, 22b, 22c connect to the same network. During travel, discontinuity of service becomes more problematic and the strategy may be to ensure that two or three of the mobile radio modems 22a, 22b, 22c connect to different networks.

In fact in the present embodiment the modem allocation logic distinguishes between three movement states and has different strategies for each, these states being:

1. static, meaning that the mobile device 12 has not moved for an extended period;
2. in motion, meaning that the mobile device 12 is actually travelling; and
3. at halt, meaning that the mobile device 12 has recently been travelling but is for the time being at rest. This often occurs during travel of course, when a car arrives at a junction, say, or when a train halts briefly at a station.

In one such example, when the mobile device 12, having been travelling, comes to a halt, it will then remain in the "at halt" state for a predetermined period. If travel re-commences during that period it returns to the "in motion" state. If the predetermined period elapses without re-commencement of travel, the device adopts the "static" state.

In the static state, the modem allocation logic serves to maximise bandwidth, even if that means connecting all of the mobile radio modems 22a, 22b, 22c to the same network. In the "in motion" state, the modem allocation logic causes each of the mobile radio modems 22a, 22b, 22c to be configured for connection to a different network. In the "at halt" state, two of the mobile radio modems may be connected to the same network, but the other mobile radio modem must be connected to a different network.

Maximising the number of different networks to which the mobile device 12 connects during travel serves to minimise discontinuity of service, both because (a) it minimises problems arising from incomplete geographical coverage by individual networks—where one network is not available, another may be; and (b) cell boundaries of the different networks are different. Hence the different modems, connected to different networks, typically suffer handovers from one base station to another at different times. If one network suffers a temporary loss of service during a handover, the other networks will often remain available to maintain a constant data connection.

An example may serve to illustrate the operation of the system. A user wishes to stream a video on a laptop whilst on a train. She uses a mobile device 12 of the above-described type, taking the form of a mobile communications router and connected to her laptop through a USB cable. The mobile device 12 is able to connect to any of four mobile networks, referred to herein simply as N1, N2, N3 and N4. The train is not equipped with Wi-Fi so data is exchanged through the mobile networks. The mobile device 12 provides bonded access to the mobile networks. The mobile device 12 monitors connection quality of all three of its network connections at intervals, and it also uses its geolocation system to monitor whether the mobile device 12 is in motion, static or "at halt". While the train is in motion the "in motion" modem allocation strategy is applied, so that each of the mobile radio modems is connected to a different network, say N1, N2 and N3, providing a high throughput, stable and secure connection.

As the train approaches a station it moves through a part of the track that is flanked by steep embankments, impairing network connections, and the modem allocation logic registers the following connection quality:
  modem 22a allocated to network N1 has status RED due to insufficient signal strength to connect;
  modem 22b allocated to network N2 has status AMBER as the connection signal strength is poor but connected; and
  modem 22c allocated to network N3 has status GREEN as the signal strength is sufficient to provide a good connection.

The connection speed available to the user drops, but with one strong connection remaining it is still sufficient to stream video. The train and the mobile device 12 are now at halt. Given the RED status of modem 22a, the modem allocation logic re-allocates that modem to a different network N3 (currently providing a good connection). To this end, the modem allocation logic retrieves from the IMSI register 26 a new IMSI associated with network N3 and writes it to the eSIM 24 associated with the modem 22a, which is then re-started. During the modem re-start the device driver for the modem 22a is re-loaded, copying the IMSI in the associated eSIM 24 to the driver and re-enrolling the modem 22a as a network N3 connection. After completion of the re-start, the modem 22a connects to the newly allocated network N3, and it forms a strong connection, increasing the available bandwidth.

After an interval the modem allocation logic again measures connection quality and registers the following:
  modem 22a allocated to network N3 has status GREEN as the signal strength is sufficient to provide a good connection;
  modem 22b allocated to network N2 has status AMBER as the connection signal strength is poor but connected; and
  modem 22c allocated to network N3 has status GREEN as the signal strength is sufficient to provide a good connection.

Next, the modem allocation logic re-allocates modem 22b to a new network, selecting network N4 since (a) the mobile device 12 is in the "at halt" state, so that connection of all modems to the strong network N3 is forbidden and (b) of the other networks, N1 was last measured to be providing no connection. The process of re-allocation of the modem 22b involves the steps described above of retrieving from the IMSI register 26 a new IMSI, this one associated with network N4, and writing that IMSI to the modem 22b, which is then re-started and thus re-enrolled as a network N4 connection. When the modem allocation logic again measures connection quality, it registers the following:
  modem 22a allocated to network N3 has status GREEN as the signal strength is sufficient to provide a good connection;
  modem 22b allocated to network N4 has status GREEN as the signal strength is sufficient to provide a good connection; and
  modem 22c allocated to network N3 has status GREEN as the signal strength is sufficient to provide a good connection Thus, while the train is at halt at the station, the available bandwidth is maximised. As the train pulls away, the mobile device 12 detects that it is once more in motion and thus carries out a re-allocation to accord with the rule that whilst in motion all modems are connected to different networks. In this example modem 22a is re-allocated to network N2, given that when last measured network N1 was providing no connection.

In the present embodiment, the modem allocation logic is configured to re-allocate only one of the mobile radio modems 22a, 22b, 22c at any given time.

Creation and Exploitation of Network Coverage Data

It was noted above that in allocating the modems to the mobile networks, the modem allocation logic may take account of network coverage data and of the geolocation of the mobile device 12.

If the connection quality available through the mobile networks is known for the geolocation of the mobile device 12, then that information can be used to inform the allocation of the modems to the networks.

Network coverage data is data that enables an estimate of available connection quality for the mobile networks to be obtained based on geolocation. Network coverage data will not necessarily be complete, in the sense that it may be available for some geolocations and not for others. In the present embodiment, the network coverage data comprises a database created using historical data giving measured signal strengths for the networks at a number of different geolocations.

The present invention provides an especially advantageous way to obtain the network coverage data. The mobile devices 12 themselves are exploited for this purpose. It will be clear from the foregoing explanation that in operation each mobile device 12 carries out repeated measurements of the connection quality of multiple mobile networks. The mobile device 12 also determines its own geolocation. According to the present embodiment, network coverage data is compiled using the connection quality measurements made by the mobile devices 12.

The network coverage data may be compiled and stored by the mobile device 12 itself, for its own use. A given user is likely to visit places numerous times, and to repeat journeys. For example, the user is likely to spend much time at home, and at a place of work, and to travel between them. By compiling and storing network coverage data on the mobile device 12, therefore, useful data can be obtained.

But a much larger data set can be obtained by having the mobile devices 12 each report measurements of network connection quality to a remote, shared database. The architecture represented in FIG. 1 lends itself especially well to this process since data from the mobile devices 12 is routed through the intermediary 14. Hence the intermediary 14 is able to receive, process and store the network connection quality measurements from a large population of mobile devices 12, and thereby to create an extensive database of network coverage data, represented in FIG. 1 by network coverage data server 30.

In the present embodiment, the modem allocation logic causes data resulting from the periodic measurements of network connection quality to be stored in association with the geolocation at which the measurements were taken. The data may be logged locally on the mobile device 12 and uploaded periodically to the network coverage data server 30, where it is processed and used in compiling a shared database of network coverage data. This data may be sent anonymously by the mobile device 12 e.g. in a small text-based update including the network (N1, N2 . . . ), network connection quality (which may be in the RED/GREEN/AMBER format discussed above, or may be numerical in nature) and the geolocation (e.g. in the form of coordinates). These measurement points are logged by the network coverage data server 30 and used in compiling a master network connection quality map and database. The accumulation of historic network connection quality data received from many mobile devices 12 makes it possible to create a detailed and accurate map of network coverage data to the benefit of all users, its data points being focussed naturally on regions of special significance such as transport corridors (train lines, motorways, main roads and so on), and on regions of high population density and activity, such as cities.

Use of the network coverage data makes it possible to optimise, or at least improve, the strategy for allocation of modems to mobile networks, the modems being configured on the basis of geolocation using the network coverage data, with their configuration being adjusted or confirmed based on real time measurements of network connection quality if need be.

Consider again the example of a user on a train. When the user boards the train and activates the mobile device 12, it initially connects to three mobile networks and also, in this example, detects an on-board Wi-Fi SSID operated by the train company and connects to that. As the mobile device 12 establishes a connection to the intermediary 14, a service running on the intermediary 14 detects that the user of the mobile device 12 is authorised for access to the service provided using the network coverage data (which may for example be a subscription service, or may simply be contingent on the user authorising the mobile device 12 to contribute its connection quality measurements to the database). The modem allocation logic confirms connectivity with the server 30 and requests network coverage data for a certain area, say a 10 km radius centred on its current location. The requested network coverage data is downloaded to the mobile device 12 which then re-allocates the mobile radio modems 22a, 22b, 22c causing them to connect to respective networks selected based on the network coverage data. The new modem configuration provides the best available mobile connection.

As the train travels, the modem allocation logic repeatedly interrogates the network coverage data and checks the actual (measured) connection quality provided through all of the mobile radio modems 22a, 22b, 22c. Based on the network coverage data and its geolocation data (from which speed and direction of travel can be obtained), the modem allocation logic is able to predict when re-allocation of the modems can advantageously be carried out. For example, suppose that modem 22a is connected to network N1 but interrogation of the network coverage data, combined with the known direction and speed of travel, indicate that the train is approaching a region in which network N1 has poor coverage or no coverage. The modem allocation logic then re-allocates modem 22a to a different network proactively, before the train reaches the relevant region.

As the train travels, the modem allocation logic periodically downloads additional network coverage data to maintain a 10 km "buffer" radius of data coverage around the device's actual location.

The dynamic allocation of modems to networks thus provides numerous advantages. It reduces equipment complexity and cost since it reduces the number of modems required. It allows efficient energy usage since it reduces the need to operate modems inefficiently at high power to connect to distant mobile base stations providing a weak signal. The energy cost of having a modem poll at high power in an attempt to connect to a network that is unavailable can be avoided. Dynamic allocation makes it possible to exploit the high bandwidth provided through strong base station connections where appropriate, giving the user the fastest available connection, but also makes it possible to prioritise continuity of connections when appropriate, as when traveling.

User Guidance

A user of a mobile device who finds that her device has no mobile connectivity will often change location in the hope of finding a signal. Some users learn, through experience, that a certain location that they often visit has no mobile connectivity, and that by taking a short walk to another spot they can establish a connection. But on other occasions the user may simply find himself walking randomly in the hope of finding a signal.

The present inventor has recognised that once network coverage data has been obtained, it can be used to guide a mobile user toward a destination where connectivity is available. This may be used to assist users of the type of mobile device 12 described above having the facility to connect to multiple mobile networks. But it may additionally or alternatively be provided as service to users of more conventional mobile devices configured for connection to a single network.

Guidance is provided through an application implemented on the mobile device 12 which interrogates the network coverage data. The application implements a strategy for choosing the destination, which may for example be based on finding the shortest route to an area in which the network coverage data indicates that adequate network coverage is available. The application additionally provides the user with directions to the destination. This may be as simple as an arrow displayed on a screen of the mobile device 12, pointing in the direction that the user needs to travel. A distance to the destination may also be displayed to the user, along with an indication of current network signal strength.

The application needs access to local network coverage data to function, and typically it needs this at a time when network connectivity is unavailable, but a variety of strategies can be used to address this issue. One such strategy is to periodically download network coverage data for a certain area around the user's location, whilst network connectivity is available. Another is to store on the mobile device 12 a suitable subset of the network coverage data.

Cyber Security

In the architecture depicted in FIG. 1, bonded communications with the mobile devices 12 are routed through the intermediary 14. This provides opportunities for the intermediary 14 to protect users against cyber-attack. Software running both on the mobile devices 12 (which is downloaded to those devices upon enrolment for the bonded service, and which is updated as necessary) and on servers of the intermediary 14 (schematically represented in FIG. 1 by a security server 36) provide real time cyber-defence and threat detection.

Figure 3:
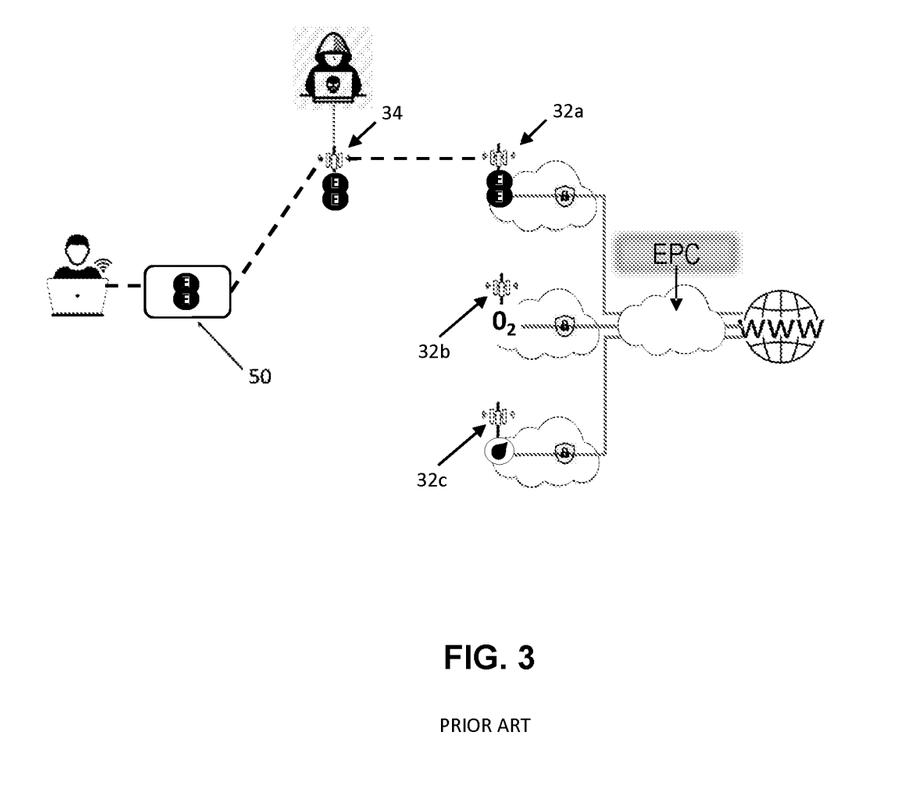
FIG. 3 is a schematic representation of a conventional mobile communications system belonging to the prior art subject to a cyber-attack.

As an example of the facilities offered, consider the type of "Man in the Middle" cyber-attack that can, as explained above, be made using a so-called IMSI Catcher. FIG. 3 provides an illustration. A conventional mobile device 50 which may for example be a smartphone is configured to connect to a mobile network 16a through a network base station 32a, but in the manner described above with reference to the prior art, this connection is diverted by the IMSI Catcher 34, so that exchange of data by the conventional mobile device 50 goes on via the IMSI Catcher 34, which is thus able to obtain potentially sensitive data.

The communications architecture illustrated in FIG. 1 and embodying the present invention can be more secure against cyber-attacks, including Man in the Middle attacks, for a variety of reasons.

Figure 4:
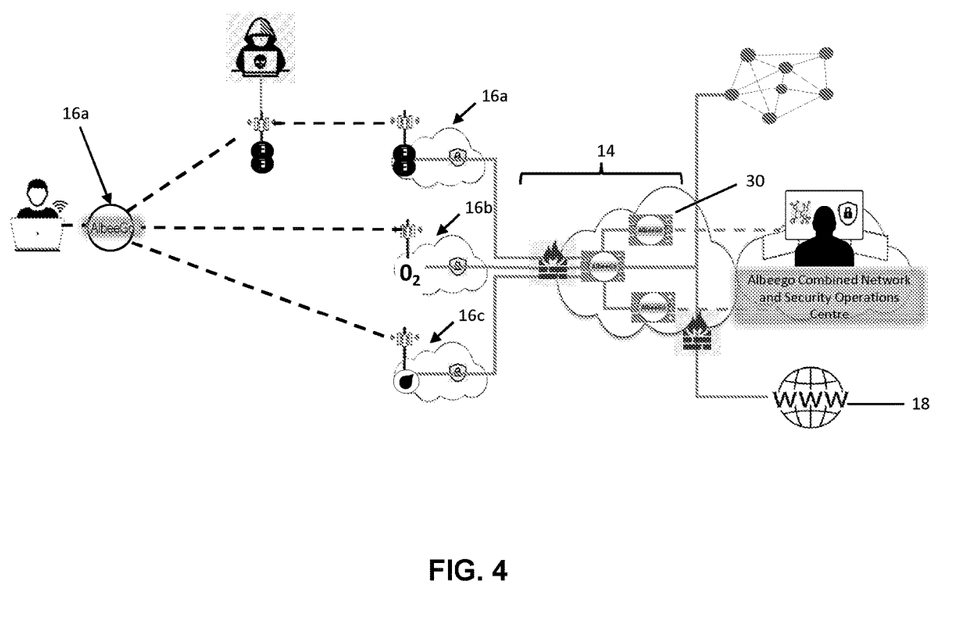
FIG. 4 is a schematic representation of the same communications system depicted in FIG. 1, subject to a cyber-attack.

The mobile connections are being used, in the architecture according to the invention represented in FIGS. 1 and 4, for exchange of data between the mobile device 12 and the intermediary 14. This facilitates encryption/decryption of the transmitted data. Each of the mobile connections to the mobile networks 16a, 16b, 16c constitutes a virtual private network (VPN) for communication between the mobile device 12 and the intermediary 14. A security application implemented on the mobile device 12 encrypts the data for despatch and decrypts incoming data. A complementary security application implemented on the intermediary 14 decrypts data received from the mobile device 12 for onward delivery (e.g. through the internet 18) and encrypts outgoing data for despatch to the mobile device 12. The suite of software provided to the mobile device 12 upon enrolment for the bonding network service can include the encryption software to be implemented on the mobile device 12.

In the event of a Man in the Middle attack, the data received by the cyber-criminal will thus be encrypted and will be difficult or impossible to decrypt.

Furthermore, a Man in the Middle attack will typically capture only a single IMSI and intercept data being sent through a single mobile network connection. In the present system, data is typically transmitted through three separate network connections. Hence even if the Man in the Middle attack caused a breach of data security, it would be expected to yield only one third of the data transmitted. Refer in this respect to FIG. 4, where just one of the network connections is seen to be subject to attack.

So, the system can be secure against a data breach through a Man in the Middle attack. But there is also the possibility of a DoS attack. While such an attack does not involve a loss of data as such, it can cause significant damage. If this type of attack were used to deny service to an IoT gateway, for example, it could cause substantial disruption due to isolation of the IoT network.

The system described herein is inherently more secure against a DoS attack than a system that is dependent on a connection through a single mobile network. If such an attack succeeds in denying service to a mobile device 12 through one mobile network connection, two further network connections will typically remain through which data can continue to be passed. The connection which is subject to a successful DoS will cease to transmit data between the mobile device 12 and the intermediary 14, and the mobile device 12 will thus automatically respond by re-allocating the relevant mobile radio modem. The connection subject to the attack is thus replaced, and the attack thereby defeated.

Nonetheless, the system is specifically configured to identify DoS attacks, as will now be explained.

A DoS attack results in a loss of connectivity between the mobile device 12 and the intermediary 14 through one of the mobile connections. So, a loss of connectivity may be indicative of a DoS attack. But a loss of connectivity can also result from other causes, such as a routine handover from one mobile base station to another during travel. So, it is necessary to distinguish between loss of connectivity due to an attack, and loss of connectivity due to other causes. In response to a loss of connectivity through any of the available mobile network connections, the security software running on the mobile device 12 and/or on the servers of the intermediary 14 applies the following logic:

if connectivity is lost through a mobile network connection whose network connection quality is RED, the inference is that the loss of connection results from some routine factor such as base station handover, and no security action is needed;

if connectivity is lost through a mobile network connection whose network connection quality is AMBER or GREEN, then the inference is that an attack has been made on the relevant network connection.

If an attack is detected then not only will the relevant mobile radio modem 22a, 22b, 22c be re-allocated, providing it with a different IMSI profile and so defeating the attack, but a reporting process is also initiated. The security software interrogates the connectivity log of the affected mobile radio modem 22a, 22b, 22c, obtaining the identifier of the mobile base station to which it was connected. In current mobile networks this identifier is referred to as the Base Station Identity Code (BSIC). It then forwards this data to the intermediary 14, and specifically to the security server 36 of the intermediary 14.

The intermediary 14 thus receives from the population of mobile devices 12 reports of possible attacks, and is able to respond appropriately. In the present embodiment, this response involves compilation of a "black list" of BSICs believed to belong to be associated with cyber criminals. Typically, in response to one or more reports of attacks, a check will first be made on the legitimacy of the BSIC. This may be carried out by a human operative who checks with the relevant mobile network operator whether a legitimate mobile base station exists with the relevant BSIC, or the process may in other embodiments be computer implemented. If this check reveals that there is no legitimate base station having the BSIC in question then that BSIC is added to the black list. In the present embodiment the black list thus compiled is distributed by the intermediary 14 to the mobile devices 12, and is periodically updated. The mobile devices 12 store the black list. Before establishing any mobile network connection, the modem allocation logic implements a check of the BSIC received from the base station against the black list. If the BSIC is on the black list then the connection is not established.

In this way security against cyberattack can be improved and opportunities are provided for detection of cybercrime.

Identity Obfuscation

Cyber-criminals wishing to identify a mobile device and its user can do so by monitoring the connectivity database of a mobile network operator (referred to in relation to current mobile standards as the EPC HSS—the Evolved Packet Core Home Subscriber Server). The criminal may attempt to build up an identity profile of the user by applying behavioural analysis techniques. Monitoring the presence of an IMSI in the database and correlating that with secondary intelligence such as HUMINT is one way to build a profile of the user, and once such a profile has been established the presence of the IMSI on the database may allow the cyber-criminal to track the user via the mobile device, or subject them to a more direct attack.

Cybercriminals may also exploit a mobile device's network identifier for profiling purposes. In current mobile networks this identifier is referred to as the IMEI ("International Mobile Equipment Identity"). The IMEI uniquely identifies a mobile radio transmitter and can therefore be used to identify a connected device. In the UK it is at the time of writing illegal to alter the IMEI of the device, although many other countries do not impose this restriction.

When a mobile device connects to a mobile base station, the device's IMSI and IMEI are both transmitted to the network. The repeated transmission of this IMSI/IMEI combination by a conventional mobile device may be used by cyber-criminals to accelerate behavioural analysis and hence identification of the device's user.

It is said that certain organisations have a policy of replacing mobile devices after just six months of use, to guard against profiling of the device and its user.

The system described herein is able to provide improved security against profiling.

In relation to the IMSI, attacks on conventional mobile devices are able to exploit the fact that a given device typically operates consistently with the same SIM and hence the same IMSI. In principle a given user might purchase multiple SIMs and hence multiple IMSIs, but this would entail the expense and inconvenience of maintaining multiple network subscriptions.

A mobile device 12 of the type described above is able to frustrate attempts to exploit the IMSI for purposes of profiling due to its ability to operate with numerous different IMSIs. As explained above, the IMSI register 26 is able to store a number of different IMSIs. Multiple IMSIs may be provided on one device for each of the available mobile networks, and these may be used flexibly in order to resist attempts at profiling. For example, on start-up, the IMSI used for connection to any given mobile network may be chosen at random from a group excluding those IMSIs that were in use when the device was last shut down. Subsequently IMSIs loaded during re-allocation of modems may be chosen at random, or may be chosen in rotation, or may be chosen by some more sophisticated strategy. If the need for anonymity is very high (e.g. in defence applications perhaps, or in relation to the security forces) then a large number of IMSIs (the present embodiment provides for 99 of them in the IMSI register 26) may be provided. But further, the IMSI register 26 may be updated through the network connections by the intermediary 14, increasing flexibility in this respect.

In short, whereas in conventional usage of mobile devices the IMSI is closely associated with a given user, the present invention makes this association unnecessary.

Attempts at profiling based on the IMEI may be defeated by changing the NEI of the mobile device 12. Due to legal restraints on re-assignment of IMEIs, this must in some countries be carried out by physical substitution of components. In certain embodiments the mobile device 12 takes the form of a router incorporating three mobile radio modems which can each be disconnected, removed and substituted. A given user might be provided with a set of radios enabling them to substitute radios at intervals. Radios might be circulated among different users to obfuscate user identity.

In countries whose law permits the IMEI of a given radio to be changed, the IMEI may be altered through software. For example, the mobile device 12 may incorporate a register of IMEI profiles. Upon start-up, the application running on the mobile device 12 loads the drivers of the attached radios into memory, identifying the radios from their IMEIs which are read from the modems into memory. However the application then takes three IMEI profiles from the register and overwrites the real IMEI numbers in the drivers. The IMEI profiles may for example be chosen at random, or according to some other strategy contrived to defeat profiling. The register of IMEI profiles may be updated through the network by the intermediary 14.

Second Embodiment

The present invention may be implemented using "Roaming eSIM" technology. At the time of writing, many "Mobile Virtual Network Operators" (MVNOs) offer commercial packages which give the user access to multiple mobile networks through a single SIM. A device operating with a roaming eSIM is able to switch automatically from one network to another, based on network availability and on local network performance. Typically, a conventional device operated in this manner has only a single network connection—it connects only to one network at any one time. Roaming eSIMs may be steered, meaning that they are biased toward use of a particular network, where that is available, or un-steered, meaning that they choose the network to connect to based on performance, without being required to use a certain network if it is available In mobile device 212 schematically represented in FIG. 5, three modems 222 are each provided with a respective roaming eSIM, and so are each capable of selecting the network to connect to, based on local network performance. But in accordance with the present invention, they may also be steered (directed to connect to a certain network) by a SIM steering control 260. The mode of operation of the mobile device 212 will now be described with reference to FIG. 6, which depicts steps in a loop implemented in software in a network analysis control function 262 of the mobile device 212. At step A, the modems 222 with their eSIMs are set by the SIM Steering Function 260 in "discovery mode", causing them to carry out automated network discovery. That is, they carry out a scan for available networks, and generate network intelligence for the networks identified as being available. The network intelligence thus generated is passed to the network analysis control function 262. A network intelligence tag (a record of the network data) is generated and is stored in a network intelligence database 264, for future use. Each network intelligence tag is geo-stamped. That is, it is stored along with the geolocation of the mobile device 212, as determined using the onboard geolocation device of the mobile device 212 (step B, FIG. 6). Using the network intelligence, the network analysis control function 262 determines the network connection priority—the order of preference of the networks, based on their local performance.

Figure 5:
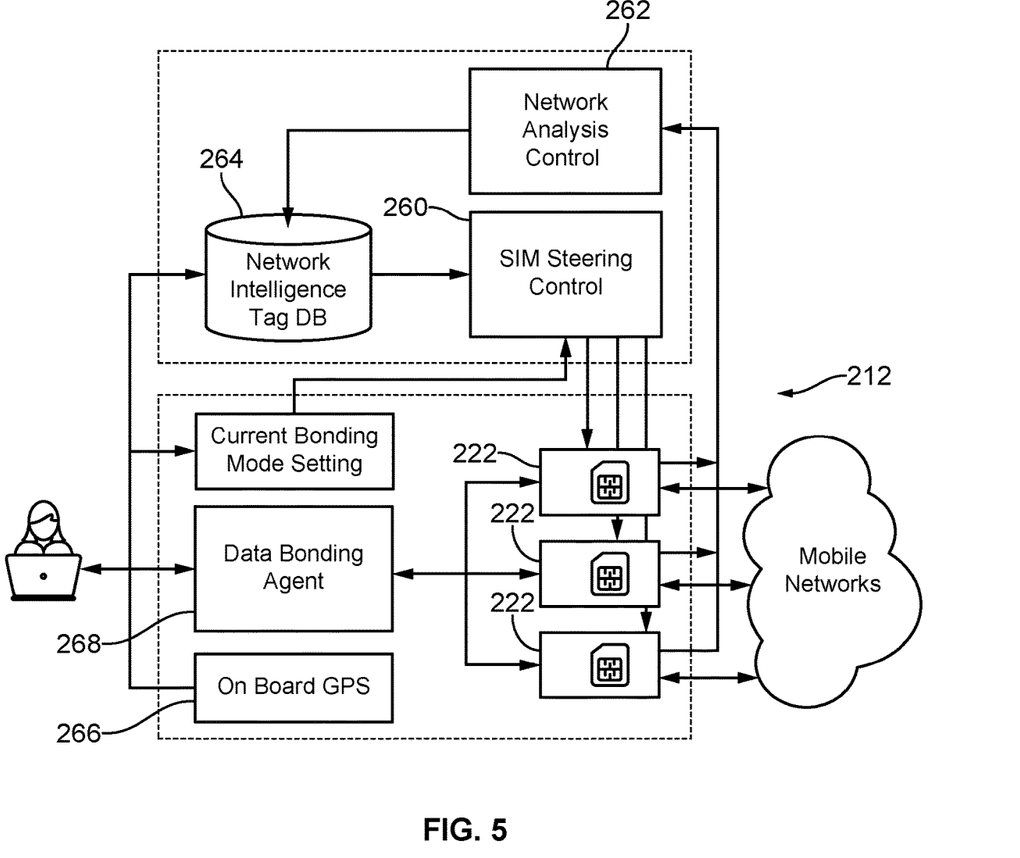
FIG. 5 is a schematic representation of functional units in a mobile device embodying the invention.

As in the first embodiment, the mobile device 212 applies the following allocation strategies in relation to the allocation of the three modems to mobile networks:

1. while the mobile device 212 is determined to be travelling, the three modems are connected to different networks;
2. while the mobile device 212 is in a halt state (not in motion, but a certain period has not yet elapsed since it came to a halt), the modems must connect to at least two different networks; and
3. while the mobile device 212 is static (and the aforementioned period has elapsed, or the mobile device 212 has not travelled since boot-up), the modems are permitted all to connect to the same network.

These rules are implemented by the SIM steering function 260. At step C in FIG. 6, the "bonding mode setting" is determined—that is, the SIM steering control function determines, based on the output of GPS 266, which of the three allocation strategies listed above is to be applied. The SIM steering function then controls the modems 222 in accordance with the selected bonding rule (step D). In the "at rest" mode, the eSIMs may be permitted to select the network to which they connect based on the network intelligence they gather. In the "at halt" state, at least one of the modems is steered to connect to a different network from the other two, and in the "travelling" state, the modems 222 are steered to connect each to a different network.

Figure 6:
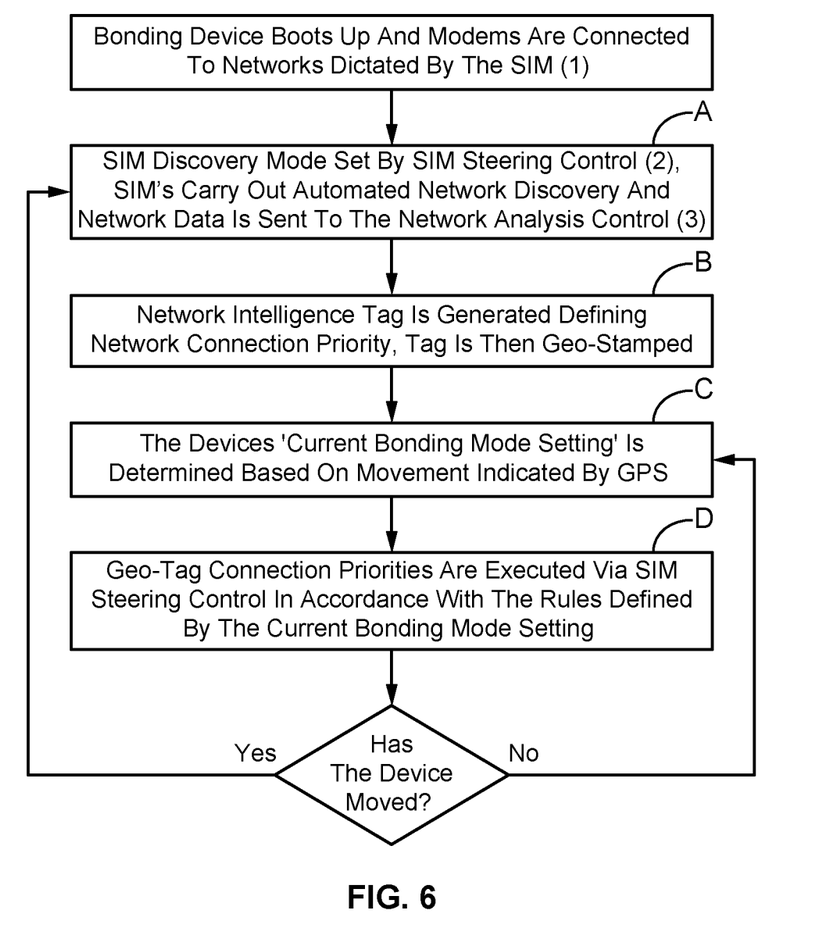
FIG. 6 is a flow diagram of operation of the mobile device.

At step E, a determination is made using the GPS 266 whether the mobile device 212 has moved. If so, the process of collection of network intelligence and of steering the modems 212 in accordance with it is repeated.

FIG. 5 additionally depicts a data bonding agent 268, which receives incoming data from the three modems 222 and compiles it into a common data stream, and which, in respect of outgoing data, divides the outgoing data stream between the modems.

Figure 7:
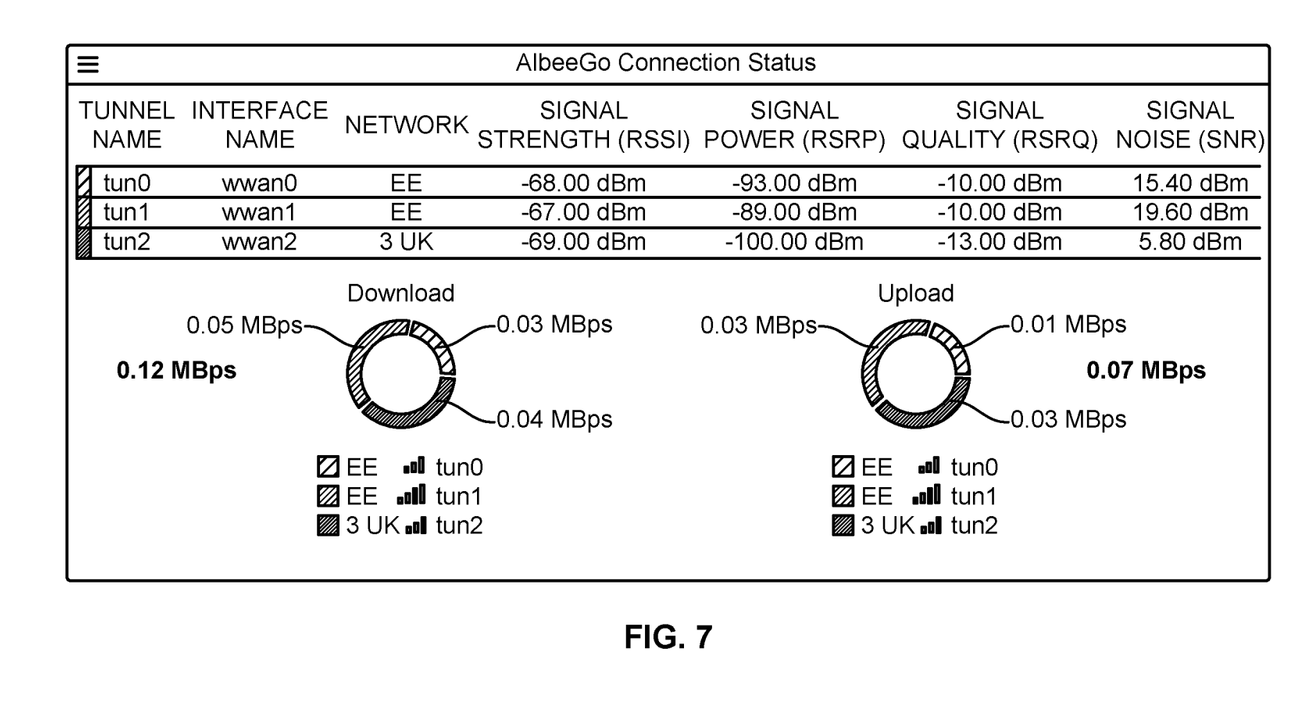
FIG. 7 is a screenshot from an app used in relation to the mobile device.

FIG. 7 is a screenshot from an application for displaying connection status of the mobile device 212. This may for example be an app running on the mobile device 212, for the benefit of the user of that device. The network intelligence is seen to comprise, in respect of each connected network (a) signal strength, (b) signal power, (c) signal quality and (d) signal noise. The determination of status for each network is made on the basis of these parameters.

The invention claimed is:

1. A mobile device comprising:
   a plurality of mobile network interface units each of which is configurable to connect to each of a group of mobile networks; and
   at least one digital processing device implementing allocation logic which allocates each mobile network interface unit to one of the group of mobile networks and causes each mobile network interface unit to be configured to connect to the mobile network to which the mobile network interface unit is allocated,
   the allocation logic being configured:
      to determine whether the mobile device is travelling or is stationary, and to apply (a) a first allocation strategy when the mobile device is travelling, the first allocation strategy requiring mobile network interface units to be allocated to at least three different networks; and (b) a second allocation strategy when the mobile device is stationary, the second allocation strategy permitting the mobile device to connect to fewer than three different networks;
      to allocate each of the mobile network interface units to one of the mobile networks based on connection quality of the mobile networks and on the current allocation strategy; and
      to re-allocate the mobile network interface units in response to changes in the connection quality of the mobile networks and to changes in the current allocation strategy, a re-allocation causing at least one of the mobile network interface units to be re-configured such as to disconnect from one mobile network and connect to another mobile network.

2. The mobile device as claimed in claim 1, wherein the processing device is configured to receive connection quality measurements from the mobile network interface units and the allocation logic serves to re-allocate the mobile network interface units in response to changes in the connection quality measurements.

3. The mobile device as claimed in claim 2, wherein the allocation logic serves to re-allocate any of the mobile network interface units in response to a connection quality measurement from that mobile network interface unit below a threshold.

4. The mobile device as claimed in claim 1 having three, and no more than three, mobile network interface units.

5. The mobile device as claimed in claim 4, wherein the allocation logic causes each of the mobile network interface units to be allocated to a different mobile network when the device is travelling.

6. The mobile device as claimed in claim 1, wherein the second allocation strategy includes:
   a halt strategy implemented for a predetermined period after the mobile device comes to a halt, in which two of the mobile network interface units are permitted to be allocated to the same mobile network and the remaining mobile network interface unit is required to be allocated to a different mobile network; and
   a static strategy implemented when the mobile device has been static for more than a predetermined period, in which all of the mobile network interface units are permitted to connect to the same mobile network.

7. The mobile device as claimed in claim 1 further comprising a geolocation device.

8. The mobile device as claimed in claim 7, wherein the allocation logic serves to retrieve network coverage data from a database by reference to a geolocation of the mobile device, and to utilise the network coverage data in allocating the mobile network interface units to the mobile networks.

9. The mobile device as claimed in claim 8, wherein the allocation logic serves to determine from data provided by the geolocation device a speed and direction of travel of the mobile device and thereby to determine whether the mobile device is moving into a region where connection quality of any of the mobile networks to which the network interface units are connected is indicated to be poor in the mobile network coverage data, and to re-allocate the affected mobile network interface unit to a different mobile network in response.

10. The mobile device as claimed in claim 7, wherein the processing device is configured to record measurements of connection quality in respect of the mobile networks in association with a geolocation of the mobile device, thereby enabling mobile network coverage data to be compiled.

11. The mobile device as claimed in claim 10, wherein the processing device is configured to cause network coverage data obtained from measurements of network connection quality to be passed to a remote server through a network.

12. The mobile device as claimed in claim 1 further comprising a list of mobile network identifiers allocatable to the mobile network interface units.

13. The mobile device as claimed in claim 12, wherein the list of mobile network identifiers is permitted to be re-written with mobile network identifiers received from a remote server through a network.

14. The mobile device as claimed in claim 1, wherein the allocation logic is configured to respond to a loss of connectivity through any of the mobile network interface units by re-allocating the affected mobile network interface unit to a different mobile network.

15. The mobile device as claimed in claim 1, wherein the allocation logic, in response to a loss of connectivity through one mobile network interface unit having a measured connection quality above a threshold, is configured to transmit the identity of the public cell tower to a database via a network.

16. A method implemented in a mobile device of exchanging data with a remote server using multiple mobile networks, the method comprising:
providing the mobile device with multiple mobile network interface units each of which is configurable to connect to each of a group of mobile networks;
determining whether the mobile device is travelling or is stationary, and applying (a) a first allocation strategy when the mobile device is travelling, the first allocation strategy requiring mobile network interface units to be allocated to at least three different networks; and (b) a second allocation strategy when the mobile device is stationary, the second allocation strategy permitting the mobile device to connect to fewer than three different networks;
allocating each mobile network interface unit to one of the group of mobile networks and causing each mobile network interface unit to be configured to connect to the mobile network to which the mobile network interface unit is allocated, said allocation being based on connection quality of the mobile networks and on the current allocation strategy; and
re-allocating the mobile network interface units in response to changes in the connection quality of the mobile networks and to changes in the current allocation strategy, a re-allocation causing at least one of the mobile network interface units to be re-configured such as to disconnect from one mobile network and connect to another mobile network.

17. The method as claimed in claim 16 further comprising measuring connection qualities of the network interface units and re-allocating the mobile network interface units in response to changes in the measurements of connection quality.

18. The method as claimed in claim 16 further comprising re-allocating any of the mobile network interface units in response to a connection quality measurement from that mobile network interface unit below a threshold.

19. The method as claimed in claim 16, wherein the first allocation strategy requires each of the mobile network interface units to be allocated to a different mobile network.

20. The method as claimed in claim 19, wherein in the second allocation strategy, two or more of the mobile network interface units are permitted to connect to the same network.

* * * * *